Oct. 7, 1941.                R. H. SIMMONDS                2,258,393
                              AUTOMATIC CLUTCH
                            Filed March 13, 1940            2 Sheets-Sheet 1
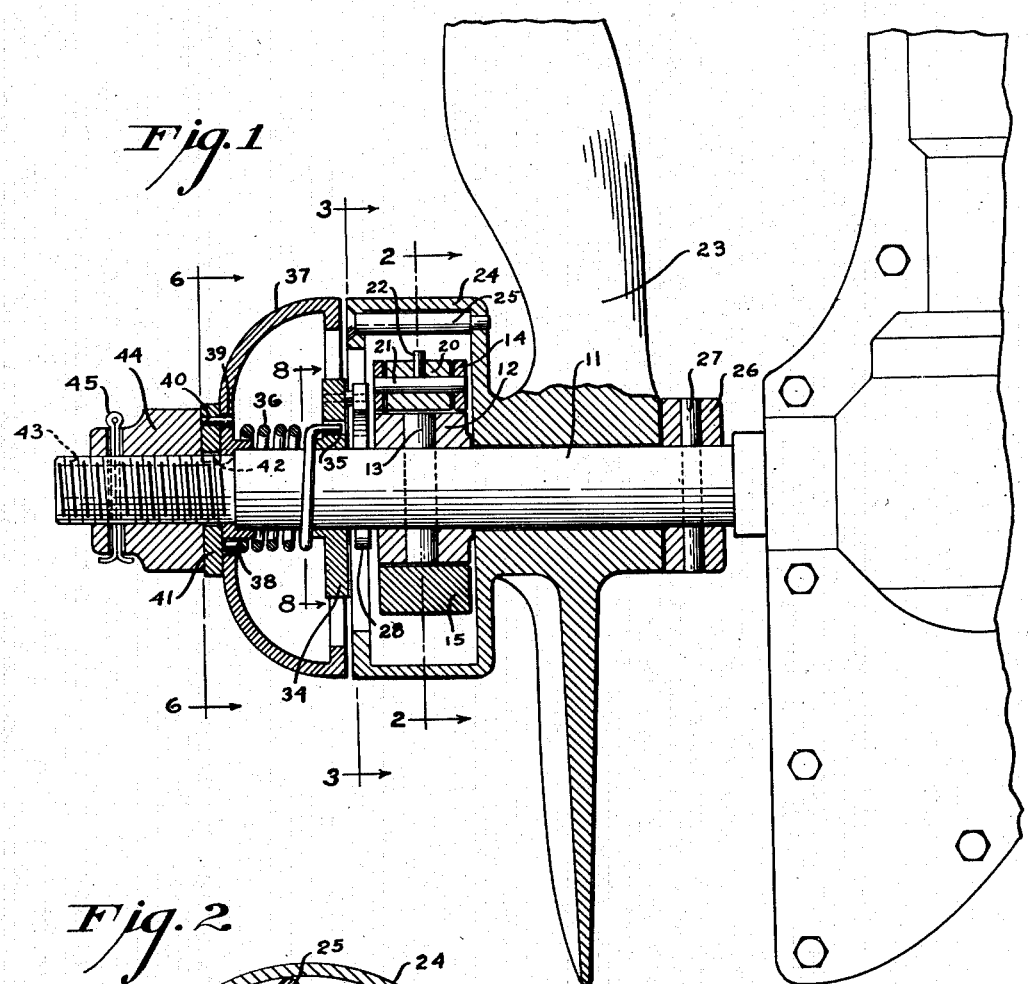
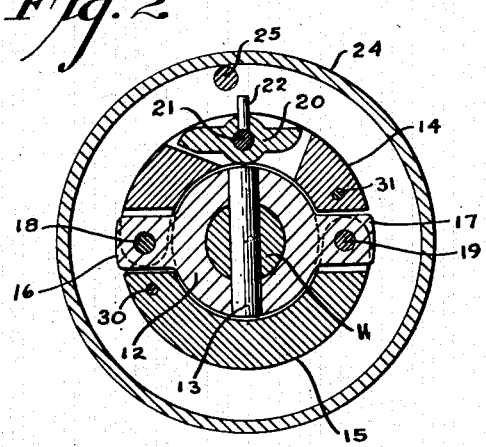
INVENTOR.
Robert H. Simmonds Oct. 7, 1941.   R. H. SIMMONDS   2,258,393
AUTOMATIC CLUTCH
Filed March 13, 1940   2 Sheets—Sheet 2

INVENTOR.
Robert H. Simmonds

Patented Oct. 7, 1941

2,258,393

UNITED STATES PATENT OFFICE 2,258,393

AUTOMATIC CLUTCH

Robert H. Simmonds, Corning, N. Y.

Application March 13, 1940, Serial No. 323,793

10 Claims. (Cl. 192—105)

My invention relates to improvements in clutches for marine and other motors, and more particularly to mechanism for establishing driving relationship between propellers and propeller drive shafts at selected engine speeds.

It is my object to provide a simple form of clutch adapted for automatically engaging or disengaging the propeller of an outboard motor at predetermined engine speeds but also adapted for apparatus of other types.

Another object is a clutch and propeller assembly which may be readily installed on the conventional outboard motor without necessitating extensive changes in the existing structure.

These and other objects may be attained through the practice of my invention, a complete description of one embodiment of which is as follows:

In the drawings which illustrate but do not limit my invention:

Fig. 1 is a sectional elevation of the invention as applied to an outboard motor;

Fig. 2 is a sectional view taken on line 2—2 of Fig. 1, showing clutching element in disengaged position;

Like parts are identified by the same reference character throughout the several views.

Figure 3:
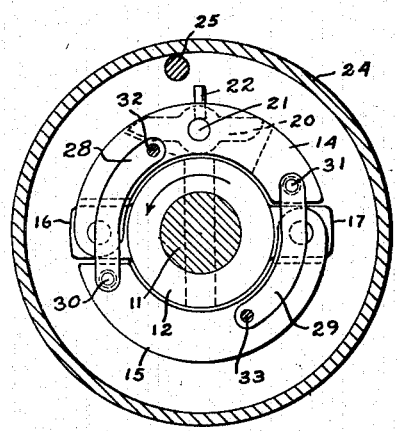
Fig. 3 is a view taken on line 3—3 of Fig. 1, showing linkage for synchronization of flyweights.

Referring to Figs. 1 and 2, the numeral 11 represents a propeller drive shaft of an outboard motor. Concentric with the shaft 11 is a weight carrying member 12 secured to shaft 11 by a pin 13. A pair of flyweights 14 and 15 are carried by lugs 16 and 17 and are mounted for pivotal movement on pins 18 and 19.

A propeller 23 is mounted freely on the shaft 11 adjacent the member 12 and has its hub extended to form a hollow shell-like portion 24. The periphery of the shell 24 is provided with a pin 25 which functions both as a drive pin and a shear pin as will appear. A collar 26 is secured to the shaft 11 by means of a pin 27 to receive longitudinal thrust of the propeller 23.

Flyweight 14 carries in its midsection a dog 20 which is mounted for pivotal rotation about a pin 21. The dog 20 is provided with a radially extended portion 22.

Figure 4:
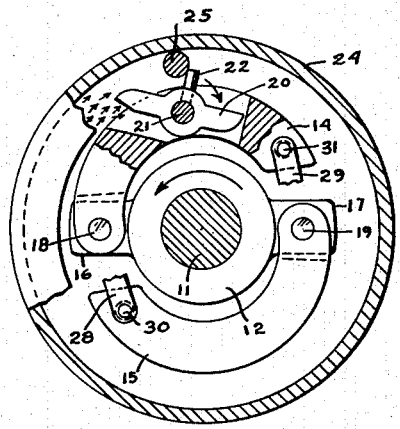
Fig. 4 is a view similar to Figs. 2 and 3, showing the clutching element in the first stage of operation.
Figure 5:
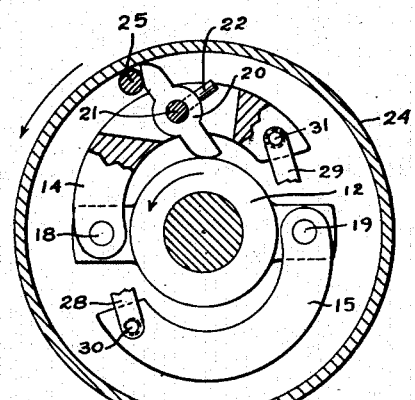
Fig. 5 is a view similar to Fig. 4, showing the clutching element in full driving position.

Referring to Figs. 3, 4 and 5, a pair of connecting links 28 and 29 are provided with pins 30 and 31 for pivotal engagement with flyweights 14 and 15. At their opposite ends links 28 and 29 are provided with pins 32 and 33 for pivotal engagement with a ring 34, Fig. 1, which is mounted for free rotation about the shaft 11.

The ring 34 is provided with an aperture 35 to receive one end of a torsion spring 36.

Figure 6:
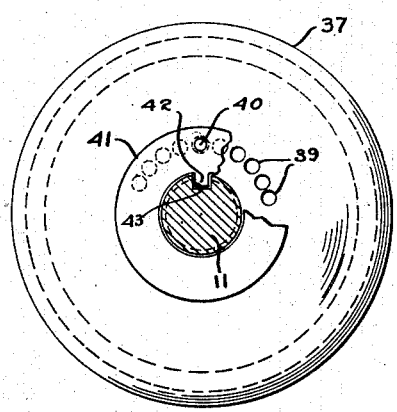
Fig. 6 is a view along line 6—6 of Fig. 1, showing parts of the adjusting mechanism.

An adjusting bell 37 is mounted for rotation about the shaft 11 and is provided with an aperture 38 to receive the other end of spring 36. The bell 37 is provided also with a series of holes 39 (Figs. 1 and 6) for engagement with a pin 40 of a washer 41. Washer 41 is provided with a radially extending lug 42 for engagement with a keyway 43 of shaft 11. A nut 44 is screwed on the threaded portion of shaft 11 and is locked against rotation in the usual manner by a cotter pin 45.

In the practice of my invention, motion is communicated to the propeller shaft 11 from the vertical drive shaft of an outboard motor, the lower housing of which is shown in Fig. 1.

By means of the drive pin 13, the weight carrying member 12 is rotated. As the speed of rotation of the member 12 is increased to a predetermined point, the flyweights 14 and 15 move outwardly under the influence of centrifugal force and against torsion of the spring 36 through mechanism to be hereinafter more fully described.

With the outward movement of the flyweight 14, the pilot pin 22 is caused to strike the pin 25. Upon such contact, the dog 20 is immediately pivoted about its pin 21 as shown in Fig. 4. The pilot pin 22 is of such proportion that it will readily pass beneath the shear pin 25 when the dog 20 is in its rocked position.

Further movement about its axis is facilitated by the action of water against the substantially flattened under-surface of the dog 20. Such action is illustrated by the small arrows in Fig. 4.

Upon completion of such movement, the dog 20 will be in position for subsequent driving relationship with the shear pin 25 at a point in the cycle of rotation remote from, and prior to its actual engagement, thus eliminating the chances of injury to the clutching element which might occur through indefinite contact.

Figure 7:
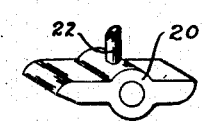
Fig. 7 is a view in perspective of the clutching element.
Figure 8:
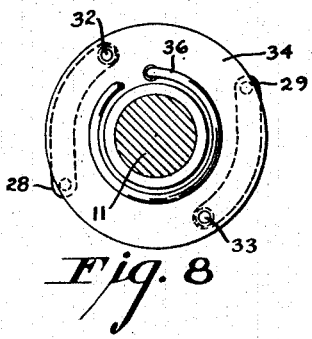
Fig. 8 is a sectional view taken on line 8—8 of Fig. 1.

The driving portion of the dog 20, as shown in Fig. 7, is of such configuration that it tends to entrap and compress the water confined between the driving and driven members, thereby cushioning the impact of such members when driving contact is made.

The driving portion of the dog 20 is provided with a substantially rounded surface for contact with the inner surface of the shell-like portion 24 to act as a stop. The opposite end of the dog 20 is likewise rounded for bearing against the hub of the member 12.

Movement of the flyweights 14 and 15 is synchronized by means of connecting links 28 and 29 and the ring 34. Outward movement of the flyweights 14 and 15 will cause the ring 34 to rotate about the shaft 11 against the torsion of the spring 36.

Adjustment of the assembly may be accomplished by removing the cotter pin 45, backing off the nut 44, withdrawing the washer 41 to release its pin 40 from engagement with the bell 37 and turning the bell 37 in the desired direction to increase or decrease the torsion of the spring 36.

The washer 41 is then replaced with its pin 40 inserted in one of the holes 39 with which it is aligned. The nut 44 is then tightened against the washer 41 and is in turn locked by the cotter pin 45.

In recent years the outboard motor has been used extensively as a source of auxiliary power on sailboats. However, the resistance offered by the propeller when such motor is not in actual operation is a serious handicap to the free movement of the craft when sailing under wind power.

This, of course, is due to the absence of a propeller freeing device such as I have disclosed herein. With the use of a device of this character, the necessity for tilting the motor out of the water is eliminated as the resistance offered by a propeller which is free to rotate about its shaft under the above conditions is negligible.

An outstanding advantage of my invention resides in the wedging action of the dog 20 between the shell 24 and the member 12 when the same is in full driving engagement. Such action results in maintaining the driving engagement at extremely low shaft speeds provided the speed of the shaft is reduced slowly. On the other hand, if the shaft speed is suddenly reduced to its minimum, the inertia of the revolving propeller aided by the propeller-turning force of the slip stream decreases the driving pressure of the dog 20 against the pin 25 and permits the spring 36 to retract the weights 14 and 15 thereby moving the dog out of driving engagement. The aforementioned wedging action will thus permit the use of my invention on fishing boats where a very slow speed is desired as for trolling, but at the same time it will not prevent the automatic disengagement of the propeller if the shaft speed is suddenly reduced as by suddenly closing the engine throttle.

The above description serves to illustrate my invention, the scope of which is intended to be limited only by the following claims.

What is claimed is:

1. In a clutch assembly, a driving shaft, a unit to be driven mounted freely on said shaft, a member fixed to the shaft and carrying weights free to move outwardly from the shaft under the influence of centrifugal force, unit engaging means associated with one of said weights, the weights being connected through a slip ring, a spring surrounding said shaft having one end anchored with respect to the shaft and its other end connected to said slip ring, said spring being tensioned to prevent outward motion of the weights at less than a predetermined shaft speed, but to permit such motion at higher shaft speeds and means for adjusting the tension of the spring.

2. In a clutch assembly, a driving shaft, a unit to be driven mounted freely on said shaft, a member fixed to said shaft, two weights carried by said member and pivoted to move outwardly from the shaft under the influence of centrifugal force, unit engaging means associated with one of said weights, a linkage connecting said weights including a slip ring and a spring which surrounds said shaft, one end of said spring being attached to said ring and the other end being anchored with respect to said shaft, said spring being tensioned to prevent outward motion of the weights at less than a predetermined shaft speed, but to permit such motion at higher shaft speeds and means for adjusting the force of the spring.

3. In a clutch assembly, a driving shaft, a unit to be driven mounted freely on said shaft, a member fixed to said shaft, two weights pivoted to said member in such a manner as to move outwardly from said shaft under the influence of centrifugal force, unit engaging means associated with one of said weights, the weights being connected through links and a slip ring, a spring surrounding said shaft having one end secured to said slip ring and the other end fixed with respect to said shaft, and means for adjusting the tension of said spring.

4. In a clutch assembly, a driving shaft, a unit to be driven mounted freely on said shaft, and means for positively connecting and disconnecting the unit and the shaft, said means comprising a member fixed to the shaft and carrying weights free to move outwardly from the shaft under the influence of centrifugal force, one of the weights being provided with a pivoted dog adapted to be turned into engagement by and with the unit when the weight has moved a definite outward distance, each weight being connected to a spring which is adapted to prevent outward motion of the weight at less than a predetermined shaft speed, but to permit such motion at higher shaft speeds and means for adjusting the force of the spring.

5. In a clutch assembly, a driving shaft, a unit to be driven mounted freely on the shaft, and means for positively connecting and disconnecting the unit and the shaft, said means comprising a member fixed to the shaft and carrying a pair of weights pivoted to move outwardly under the influence of centrifugal force, one of the weights being provided with a pivoted dog adapted to be turned into engagement by and with the unit when the weight has moved a definite outward distance, the weights being connected through links and a slip ring to one end of a spring which helically surrounds the shaft, the other end of the spring being anchored with respect to the shaft, the spring being adapted to prevent outward motion of the weights at less than a predetermined shaft speed, but to permit such motion at higher shaft speeds and means for adjusting the force of the spring.

6. In a clutch assembly, a driving shaft, a unit to be driven mounted freely on the shaft and means for positively connecting and disconnecting the unit and the shaft, said means comprising a member fixed to the shaft and carrying two weights pivoted to move outwardly from the shaft under the influence of centrifugal force, one of the weights being provided with a pivoted dog adapted to be turned into engagement by and with the unit when the weight has moved a definite outward distance, the weights being connected through links and a slip ring to one end of a spring which helically surrounds the shaft so as to resist said outward motion of the weights, the other end of the spring being engaged by a second member normally fixed with respect to the shaft, but adjustable about the shaft for adjusting the force of the spring.

7. In a clutch assembly, a driving shaft, a unit to be driven mounted freely on the shaft and being provided with a hub and a longitudinally extended hollow cylindrical shell surrounding the shaft and spaced therefrom, the outer end of the shell being provided with an inwardly extending flange, a pin inserted through the flange and into the hub, a member fixed to the shaft adjacent the hub and within the cylindrical shell, two weights supported by said member pivoted to move outwardly from the shaft under the influence of centrifugal force, one of the weights being provided with pin engaging means, a spring tending to prevent said weights from moving outwardly at less than a predetermined shaft speed, but to permit such motion at higher shaft speeds, and means for adjusting the restrictive force of said spring.

8. In a clutch assembly, a driving shaft, a unit to be driven mounted freely on the shaft and having a hub provided with a longitudinally extended hollow cylindrical shell surrounding the shaft and spaced therefrom, the outer end of the shell being provided with an inwardly extending flange, a pin inserted through the flange and into the hub, a member fixed to the shaft adjacent the hub and within the cylindrical shell, said member carrying two weights pivoted to move outwardly from the shaft under the influence of centrifugal force, one of the weights being provided with a pivoted dog adapted to be turned by the pin and to engage it when the weight has moved a definite distance outward, the weights being connected through links and a slip ring to one end of a spring which helically surrounds the shaft so as to resist said outward motion of the weights, the other end of the spring being engaged by a second member normally fixed with respect to the shaft, but adjustable about the shaft for adjusting the force of the spring.

9. In an automatically engaging clutch assembly suitable for use in establishing a driving connection between a unit to be driven and a driving member, a clutch engaging portion carried by said unit at a fixed distance from its axis and having a concentric path of travel about the axis, a governor rotatable about an axis coextensive with that of the unit and having a part movable radially as its speed of rotation increases, a pivoted lever carried by said governor having pilot and unit drive fingers with the pilot finger arranged to move into the path of the clutch engaging portion of the unit consequent to the radial movement of the governor part on which the lever is mounted and being thereafter movable about its own pivot past the clutch engaging portion, and the drive finger of said lever being so located that it is moved into the path of movement of the clutch engaging portion carried by the unit as the lever moves about its pivot consequent to the engagement of the pilot finger with the clutch engaging portion.

10. The combination with a unit to be driven and a drive shaft therefor, of a part carried by the unit through which the same may be driven, of a driving member driven by the shaft for engagement with said part to drive the unit, a pilot member fixed with respect to said driving member, and speed responsive means driven by the drive shaft for first moving said pilot member into passive engagement with said part carried by the unit to bring said driving member into driving relation with said part.

ROBERT H. SIMMONDS.